United States Patent [19]

Stevenson et al.

[11] 3,930,817
[45] Jan. 6, 1976

[54] EXTRACTION APPARATUS

[75] Inventors: Kenneth Thomas Stevenson; George Alfred Wesson; George Armine Newell, all of Nottingham, England

[73] Assignee: Newclean Engineering Limited, Nottingham, England

[22] Filed: Apr. 24, 1974

[21] Appl. No.: 463,448

[30] Foreign Application Priority Data
Oct. 31, 1973 United Kingdom............... 50550/73
Apr. 28, 1973 United Kingdom............... 20334/73

[52] U.S. Cl. ..................... 55/302; 55/385; 55/431; 55/484; 55/523; 15/340
[51] Int. Cl.² ........................................ B01D 46/04
[58] Field of Search ............ 55/302, 385, 484, 431, 55/523; 15/340

[56] References Cited
UNITED STATES PATENTS

| | | | |
|---|---|---|---|
| 2,276,805 | 3/1942 | Tolman................................ | 55/302 |
| 2,892,512 | 6/1959 | Watts et al............................ | 55/323 |
| 3,535,851 | 10/1970 | Riemsloh.............................. | 55/302 |
| 3,653,190 | 4/1972 | Lee et al............................... | 15/352 |
| 3,707,046 | 12/1972 | De Baun.............................. | 55/484 |

FOREIGN PATENTS OR APPLICATIONS
570,757  12/1957  Italy...................................... 15/340

*Primary Examiner*—Bernard Nozick
*Attorney, Agent, or Firm*—Paul & Paul

[57] ABSTRACT

A mobile dust extraction apparatus having a self cleaning filter feature has an extractor blower in fixed position; a lower storage chamber having a valved inlet at one end; an upper plenum chamber having a valved outlet at one end and a valved vent at the other, a filter between the storage and plenum chambers and a detachable connection between the blower and the plenum chamber so that the plenum and storage chambers may be moved relative to the blower.

8 Claims, 9 Drawing Figures

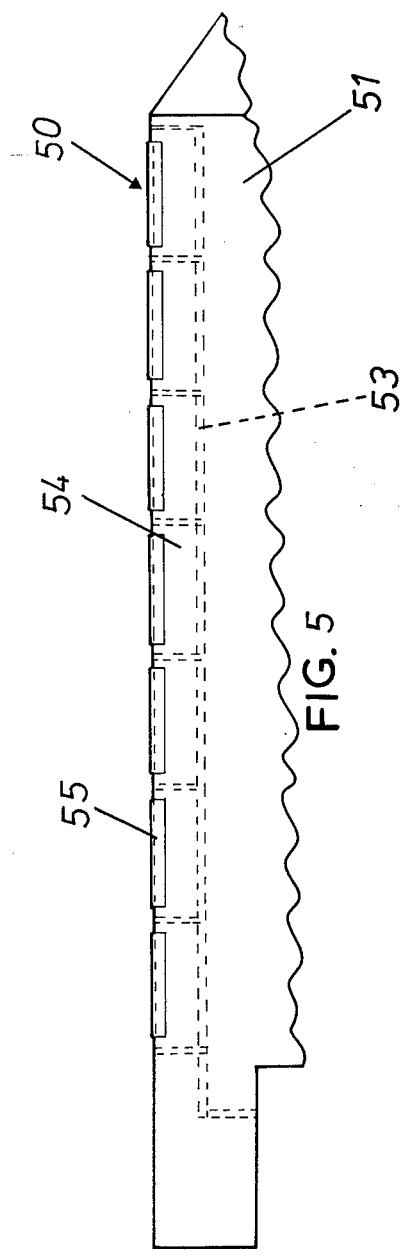

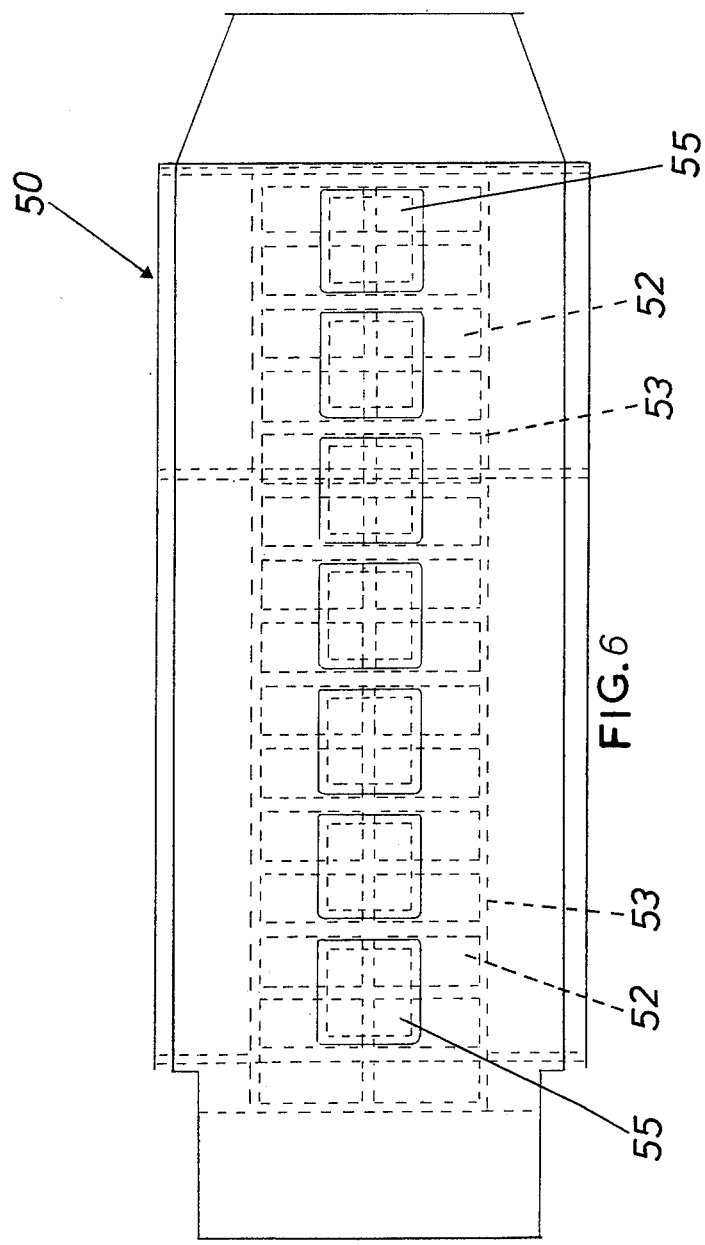

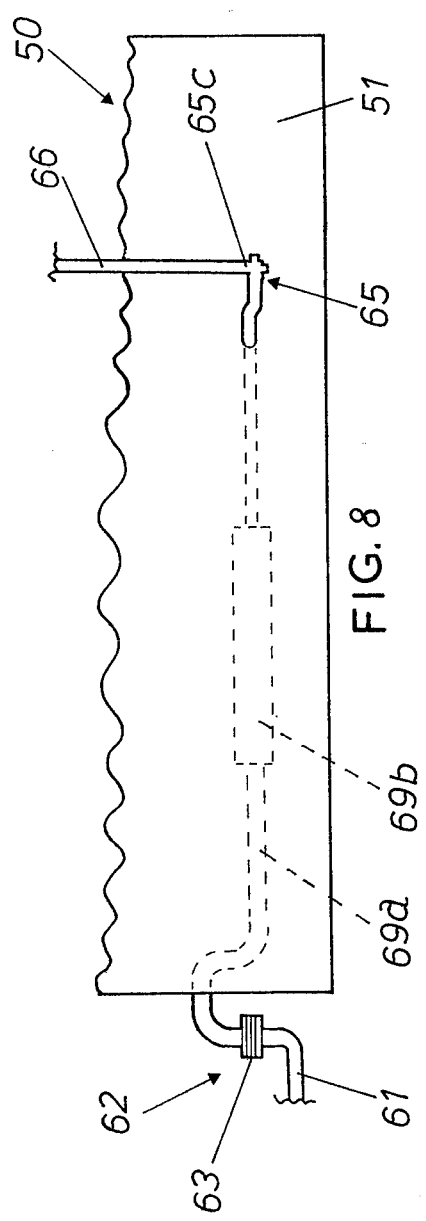

EXTRACTION APPARATUS

This invention relates to material extraction apparatus and to extraction apparatus which is adapted for storage and/or transportation of the extracted material.

According to one aspect of the invention material extraction apparatus comprises a storage chamber and a plenum chamber, the plenum chamber being connected to the storage chamber by means including a filter and also communicating with an outlet which is adapted to be connected to an extractor unit.

Preferably, the filter is a ceramic filter such as an assembly of ceramic filter tiles.

Advantageously, the tiles are removably mounted in a framework. This facilitates replacing the tiles, e.g. if a breakage or fracture occurs.

It is desirable that the storage and plenum chambers be movable between a first position for extraction and storage and a second position for discharge of stored material.

Conveniently, the outlet from the plenum chamber is adapted to be detachably connected to the extractor unit when the storage and plenum chambers return to the first position. Advantageously, the plenum chamber outlet is detachably connected to the extractor unit by connecting means including a seal which is self-aligning so that it is not necessary to effect or adjust the seal by hand.

In one form of the invention a blower unit is provided, the blower unit being connectable to a blowing chamber so that material collected in the storage chamber may be removed by blowing. Conveniently, the extractor unit also serves as a blower unit.

It is often convenient to provide a self-cleaning system which system includes a first valve connected in a vent to atmosphere from the plenum chamber and a second valve in the plenum chamber outlet.

By virtue of this system the first valve closed, the second valve open and the storage chamber also closed, the extraction unit may be operated to cause a reduction in pressure in the storage chamber. The second valve is then closed and the first valve opened which causes an in-rush of air from atmosphere into the storage chamber via the plenum chamber and the filter thus causing a reverse flow of air through the filter and removing any particles of dust which have become trapped therein.

In a particularly preferred form of the invention a position is provided to define a filter chamber between the filter and the storage chamber. Preferably the filter chamber and storage chamber are arranged to communicate with one another by communicating means adapted to be either open or closed.

The communicating means advantageously is disposed at or near an end of the storage tank remote from an inlet for material to be stored.

The provision of a separate filter chamber and communicating means enables the apparatus to be used for extracting and storing either wet or dry materials. For wet materials the communicating means is normally closed and for dry materials it is normally open. In order to facilitate extraction and storage of wet materials an auxilliary extractor unit may be provided.

The apparatus of the present invention is conveniently mounted on a mobile vehicle chassis to permit extraction and discharge at various locations and to permit transportation of stored materials.

The mobile apparatus can include an exhaust system which includes a connector whereby it may be connected to atmosphere and/or to a material blowing chamber.

In order to help reduce the noise of the apparatus in use, the exhaust system may be, at least partially, located in the storage chamber.

The invention is hereinafter more particularly described with reference to the accompanying drawings in which:

FIG. 5 is a diagrammatic cross-section of part of a modified apparatus according to the invention;

FIG. 6 is a diagrammatic plan view of the part of the modified apparatus shown in FIG. 5;

FIG. 8 is a diagrammatic cross-section of part of an apparatus having an alternative form of exhaust.

Figure 1:
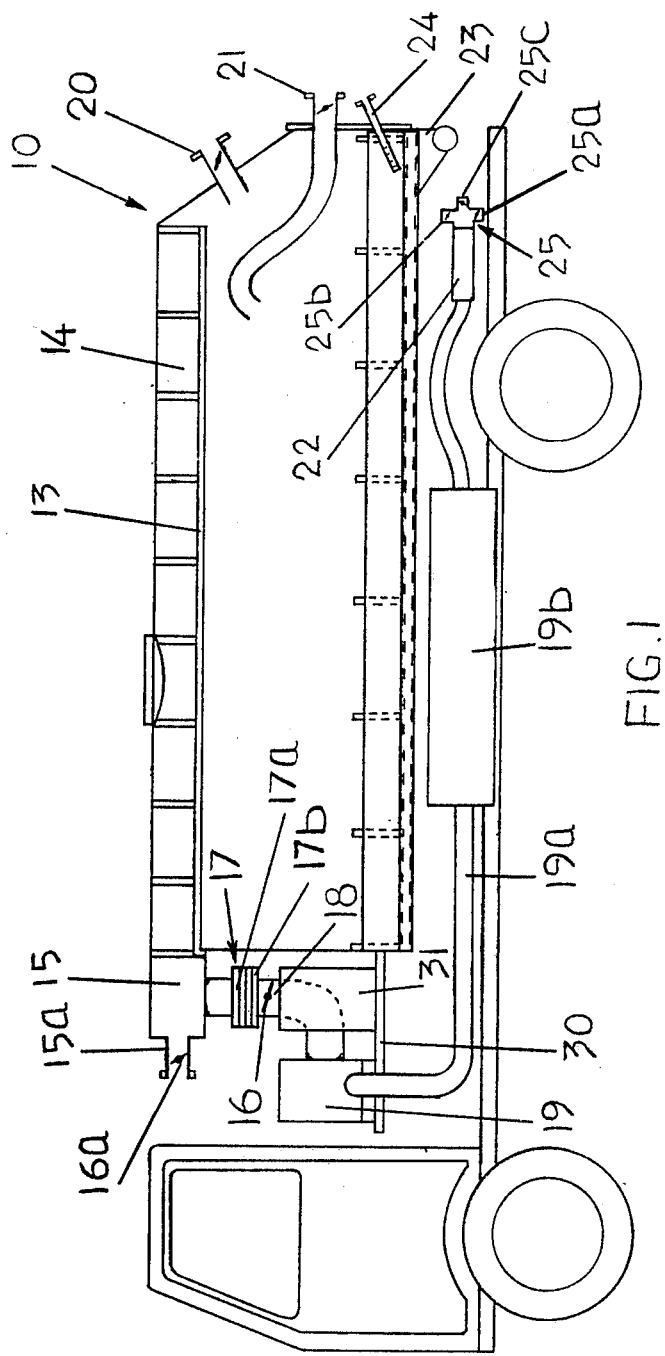
FIG. 1 is a diagrammatic view of a road vehicle carrying extraction apparatus in accordance with the invention, the extraction apparatus being shown partly in cross-section.
Figure 2:
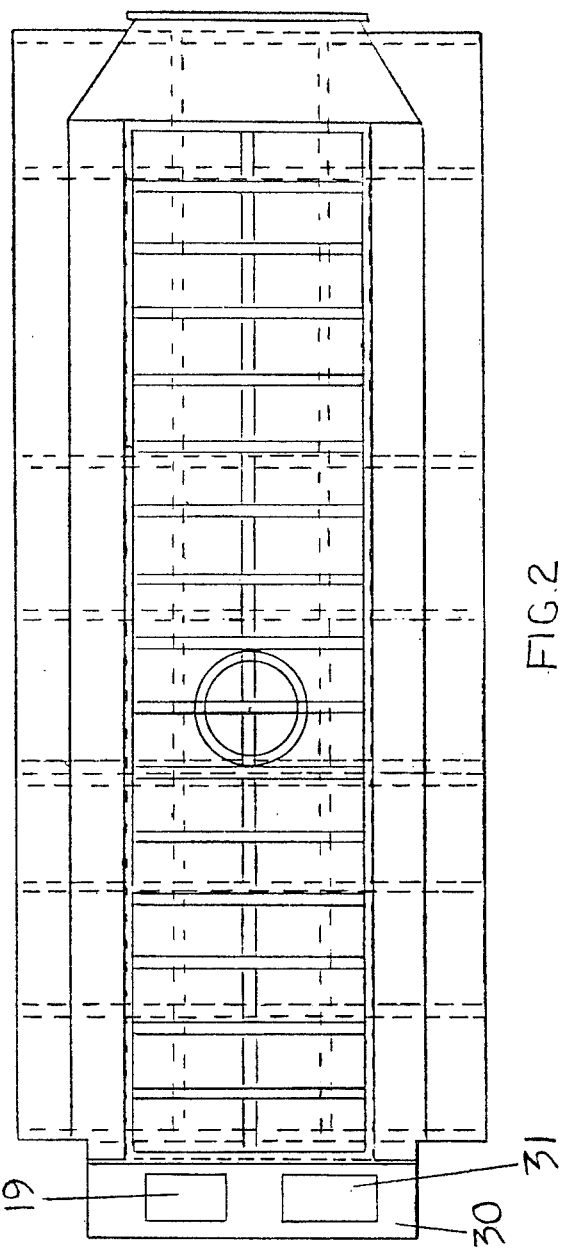
FIG. 2 is a plan view of the filter construction between the plenum chamber and the storage chamber.

The dust extraction plant includes a tank, indicated generally by the reference numeral 10, mounted on a road vehicle chassis II and comprises a storage chamber 12, a filter 13 and plenum chamber 14, extending along the upper region of the storage tank 12. The tank 10 is capable of being tipped from its normal horizontal position as shown so as to cause material stored in the storage chamber 12 to move under gravity towards the rear of the storage chamber 12.

The plenum chamber is provided with an outlet 15 in which is located a valve 16 for a purpose to be described hereinafter. The outlet 15 is connected to the upper part of a seal 17 comprising an annular rubber sealing member 17a and is sealable with a similar annular rubber sealing member 17b mounted at the upper extremity of a duct 18 connected to an extractor/blower unit 19. In addition the plenum chamber also includes an auxilliary outlet 15a including a valve 16a also for a purpose to be described hereinafter.

The storage chamber 12 includes two input pipes, an upper input pipe 20 and a lower input pipe 21. These pipes are flanged on the exterior of the storage chamber in order to permit the securement thereto of an external pipe in order to transmit dust to be stored into the storage chamber.

Also mounted on the chassis of the vehicle is an exhaust connector 22, which is connected via a silencer 19b and a pipe 19a to the outlet of the extractor/blower unit 19 whereby air from which dust has been extracted is exhausted to atmosphere via the valve unit 25.

The valve unit 25 may be connected for example by means of flexible hoses, to a blowing chamber 23 mounted at the rear end of the storage chamber 12 and communicating with a blower outlet duct 32 which is flanged so as to enable it to be connected to external pipe for delivery of the stored material.

In order to improve the flow of stored material from the storage chamber 12 into the blowing chamber 23 a second hose is provided and connected to a material aeration pipe 24, comprising an elongated tube having a plurality of radially extending apertures therein, which serves to aerate the material in the vicinity of the blowing chamber 23 and thus prevent the stored material from "bridging" and thus failing to enter into the blowing chamber 23.

The connector is also provided with an adjustment valve unit 25 which includes control valves 25a and 25b for controlling the flow of air into the blowing chamber 23 and the material aeration pipe 24 respectively and a control valve 25c which enables air to be partially vented to atmosphere in order to reduce the volume of air supplied to the blowing chamber 23 and the material aeration pipe 24.

Figure 4:
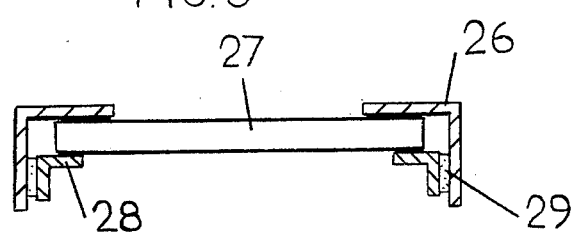
FIG. 4 is a diagrammatic cross-section of a part of the filter illustrating its construction.

The filter 13 comprises a plurality of tiles of porous ceramic material the tiles being individually mounted in an angle section frame 26. The tiles 27 are secured in the frame by the application of uncured silicone rubber composition to the periphery of the tiles and also to the angle section frame 26 placing the tiles 27 in position and then allowing the silicone rubber to cure. In order to make absolutely sure that the ceramic tiles do not become displaced in use a further angle section frame 28 (FIG. 4) is firmly secured to the first angle section frame 26 beneath the ceramic tiles 27. Finally, a layer of sealing compound 29 such as a plastic compound, comprising, for example, a plastics filled polyester resin, is applied to the joints between the frames 26 and 28 and the tiles 27 in order to give an airtight seal. In addition to providing a seal the sealing compound also serves to indicate when an air leak has occurred in that air passing through a crack in the sealing compound will tend to leave a clean zone round the crack which is readily visible upon inspection by an operative.

In order to ensure that the seal 17 between the outlet 15 from the plenum chamber and the duct connected to the extractor/blower unit 19 is maintained in operation it is necessary to provide anti-vibration mountings, such as springs or rubber blocks, beneath the plate 30 upon which the motor 31 and the extractor/blower 19 are mounted. When rubber mounting blocks are used they are preferably made from neoprene which is resistant to degradation by oils.

In operation, one or both of the input pipes 20 and 21 to the storage chamber 12 are connected by a suitable duct, such as a flexible hose, to a source of material to be stored and the storage chamber 12 is maintained in a horizontal position so that the outlet 15 from the plenum chamber 14 is in sealed communication with the extractor/blower unit 19 via the seal 17. By operating the extractor/blower unit 19 the pressure in the plenum chamber 14, and hence the storage chamber 12 is reduced so that material is drawn into the storage chamber 12 and retained therein by virtue of the presence of the filter 13. It is found, in practice, that the material drawn into the storage chamber 12 is drawn to the end of the chamber remote from the inputs 20 and 21 so that the chamber will gradually fill from that end.

The operation of the extractor/blower unit 19 is continued until the tank is full or until all the desired material has been drawn into the storage chamber. If clogging of the filter occurs then it is cleaned by a reverse cleaning method which is carried out as follows:

The valve 16a is closed and the input pipes 20 and 21 to the storage chamber are also closed. With the valve 16 open the extractor/blower unit is operated to cause a reduction in pressure in the plenum chamber 14 and thus also in the storage chamber 12. When the desired reduction pressure has been achieved the valve 16 is closed and the valve 16a which vents the plenum chamber to atmosphere is opened. This causes an inrush of air into the plenum chamber 14 and via the filter 13 into the storage chamber 12 thus removing any particles clogging the filter. The cleaning operation may be carried out when the storage chamber is empty or when it is partially filled.

Whilst the filters can be cleaned merely by the evacuation of the storage chamber and subsequent venting to atmosphere of the plenum chamber it is desirable that further cleaning means provided for "out of service" cleaning of the filter. For this purpose the duct by which the plenum chamber is vented to atmosphere is adapted to be connected to a removable pipe which, in turn, is connected to the outlet of the extractor/blower unit. By this means air may be blown into the plenum chamber and through the filter in order to effect efficient cleaning thereof.

When it is desired to removed stored material from the storage chamber the tank 10 is tilted to its tipped position so that the stored material tends to fall under gravity to the lower end thereof.

The blower is then operated and by virtue of being connected to the blowing chamber 23 causes stored material to be blown out of the blower outlet duct so that the stored material may be delivered to the desired point. In order to assist the flow of the material into the blowing chamber 23 the material aeration pipe 25 is also operated by connecting it to the blower connector unit 22 via the valve 25b. The material aeration pipe 25 comprises an elongated tube having a series of radially extending apertures in order that air delivered thereto can cause stored material in the vicinity of the blowing chamber 23 to be aerated and thus prevent bridging. By virtue of this arrangement the whole of the stored material can eventually fall into the blowing chamber 23 and thus be discharged via the outlet duct therefrom.

If desired, of course, the stored material may be evacuated from the chamber merely by tipping and opening the rear door so that the stored material is deposited from the door.

A modification of the embodiment is shown in FIG. 5. In this embodiment the arrangement of filters and inspection covers is different. The tank 50 includes a storage tank 51, a filter support framework 53 defining a plenum chamber 54 and a row of eight inspection covers 55.

The arrangement of inspection covers can be more readily seen in the plan view of FIG. 6, from which it can also be appreciated that the inspection hatches provide ready access to filter tiles 52 in the framework 53 to permit changing or maintenance thereof.

Figure 7:
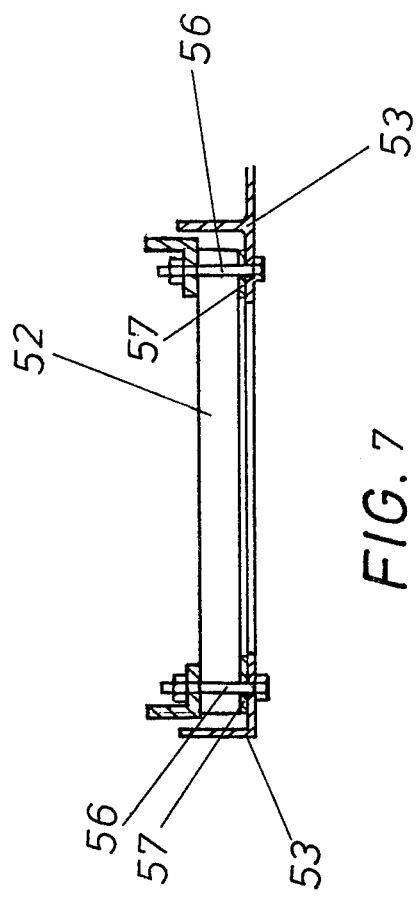
FIG. 7 is a diagrammatic sectional view of a modified method of attaching the filter tiles.
Figure 3:
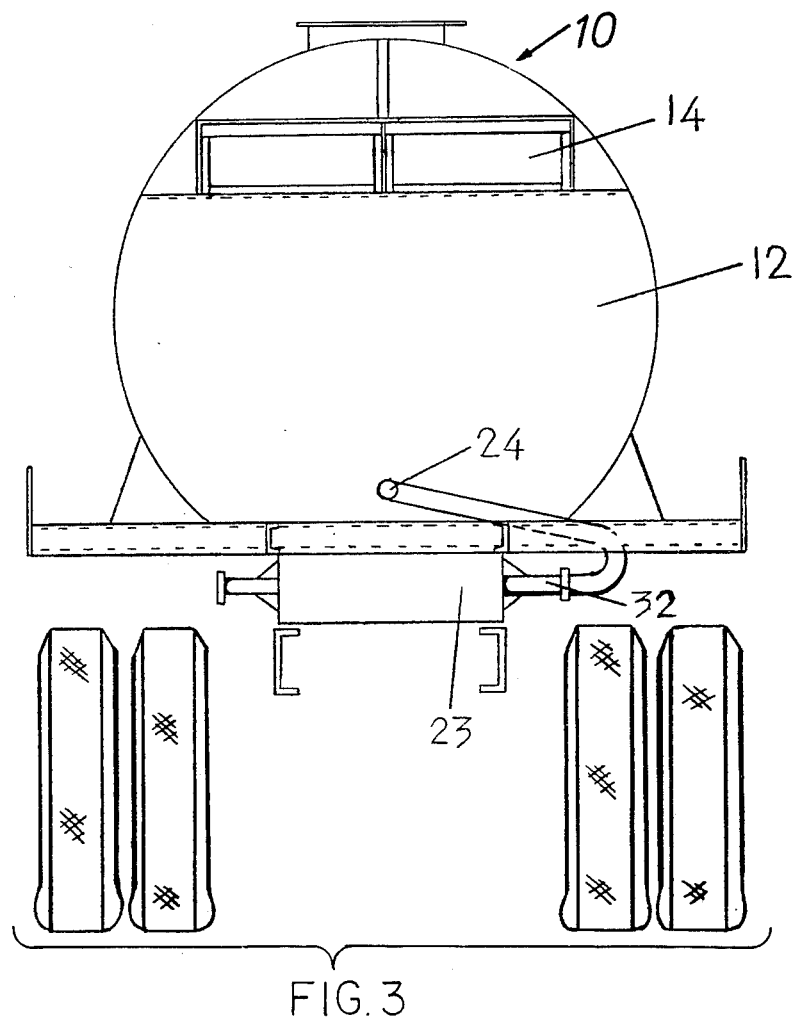
FIG. 3 is an end view of the vehicle shown in FIG. 1 with the storage chamber and plenum chamber partly in cross-section.

The manner in which the filters are held is shown in detail in FIG. 7. The framework 53 comprises angle section members which support the tiles 52, each tile being supported on all four sides. The tile is supported on the frame by means of a series of bolts 56 and sealing is achieved by the use of suitable seals 57.

The above arrangement of the filter tiles 52 in the framework 53 facilitates removal and replacement of tiles and the seal 57 serve to prevent ingress of dust to the plenum chamber 54.

Referring now to FIG. 8 of the drawings an alternative form of exhaust system is described. The extractor/blower unit (not shown) is mounted rigid with the chassis and the exhaust pipe 61 is taken to a flange type seal 62 which is provided with a sealing member 63 and operates in a similar manner to seal 17 described above for the connection to the plenum chamber. Thus when the tank 50 is in its lowered position sealed contact is made between the exhaust pipe 61 from the extractor/blower unit to the exhaust system but contact is not made when the storage chamber is in the raised position.

The remaining part of the exhaust system is similar to that shown in FIG. 1 but in this case the system is mounted inside the storate tank 51. It comprises a pipe 69a communicating with a silencer 69b and finally a valve unit 65 similar to the unit 25 in FIG. 1 and mounted externally of the chamber 51. In this case however the valve 65c communicated with a vertical stack pipe 66 which extends out of the storage chamber and is vented to atmosphere at or above the top of the vehicle. It will be appreciated that exhaust systems can be taken along either side of the storage chamber 51.

Figure 9:
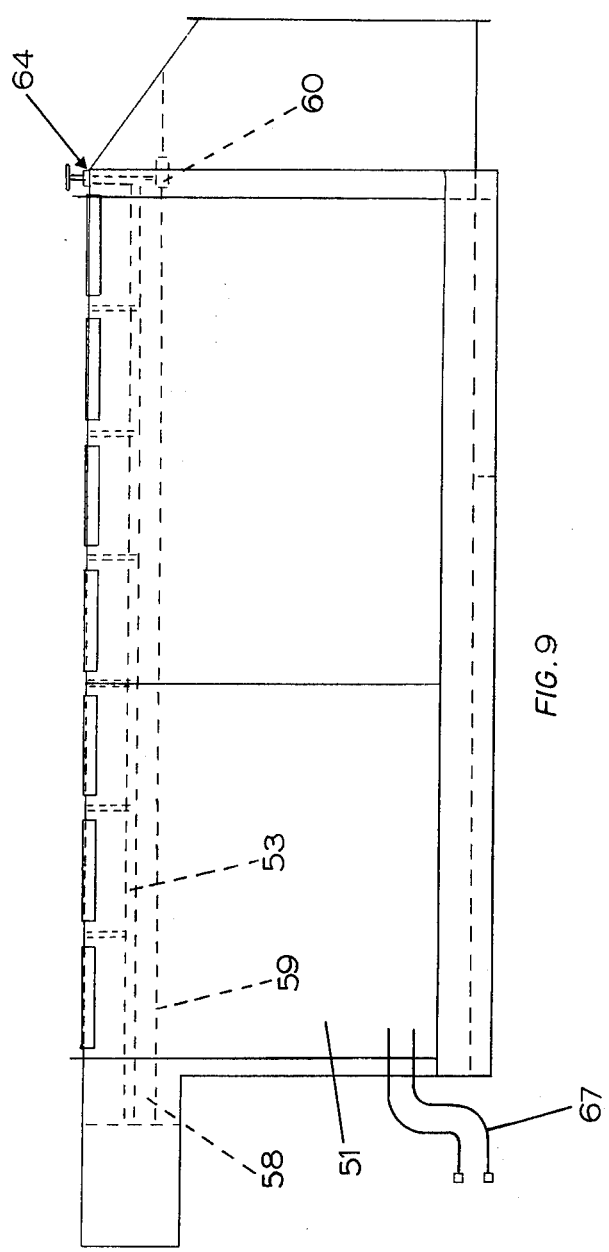
FIG. 9 is a diagrammatic cross-section of part of an apparatus modified to extract, store and transport both dust-laden products and moisture-laden products.

FIG. 9 shows a further modification of the extractor unit which is arranged so as to be capable of eatracting either dust-laden materials or moisture-laden materials. As can be seen from the drawings the construction is similar to that described above with the exception of the provision of an additional plate 59 which separates the storage tank 51 from a filter chamber 58 situated immediately below the filters 52 in the framework 53. The storage tank 51 communicates with the filter chamber 58 by means of an aperture 60 which can be either open or closed. Closure of the aperture 52 may be effected by means of a bolt-on-plate such as a hinged plate or by means of a valve system (shown schematically at 64) such as a wedge-type valve.

The inlet for material to the tank is, in this embodiment, at the opposite end of the tank from that shown in FIG. 1 and is shown schematically at 67.

If it is desired to use the extractor for dust-laden materials the aperture 60 is open and the extractor/blower unit is caused to evacuate the plenum chamber 54. This causes a reduction of pressure in the filter chamber 58 and the storage tank 51 and thus material can be drawn through the inlet 67 into the storage tank 51. In this respect the operation of the apparatus is virtually identical to that of the apparatus described above except that the dust-laden air passes through the aperture 60 into the filter chamber 58 before being filtered. It is found in practice that a relatively small proportion of the dust is deposited on the plate 59 and this can to a large extent be cleared by the reverse cleaning system described above. In order to permit access to the filter chamber 58 inspection hatches having suitable inspection covers (not shown) are provided in the plate 59.

The inlet 67 is preferably angled to produce a swirling motion inside the tank 51. More than one inlet can be provided if desired, e.g. one near each end of the tank 51.

When the apparatus is to be used for moisture-laden materials the aperture 60 is closed by means of the valve system 64 and the storage tank 51 connected to an auxiliary exhaust pump (not shown). In this matter the vehicle operates as an extractor-storage apparatus without any filtering provision as the filter is now sealed off from the storage tank 51.

A further modification which may be incorporated in the apparatus is the rigid mounting of the engine and the extractor/blower unit with respect to the vehicle. Such an arrangement is satisfactory provided that suitable flexible drives are used and this avoids the requirement of a resiliently mounted plate such as the plate 30 shown in FIG. 1.

A further additional device which may be included is a boom mounted on the vehicle for carrying a flexible duct to an auxiliary device, such as brushing equipment so that brushing and extraction can be carried out simultaneously.

In addition the storage chamber may be provided with a rear door which can hinge either sideways or upwards and which may, if desired, be operated hydraulically.

It will be apparent that the extraction apparatus in accordance with the present invention is extremely convenient in use. In particular it provides in a single unit a storage chamber, a filter and a facility for blowing. Hitherto the filter has been provided in a tank separate from the storage chamber which has meant that a considerable amount of space has been taken up with the attendant disadvantages particularly when the plant is mounted on a mobile vehicle.

In addition, the use of a relatively large area of tiles as a filter medium presents a considerable advantage over the prior art method in which pencil filters are employed. With the tiles of the present invention there is considerably less tendancy for the filter to choke and in addition it is of course, a relatively simple matter to clean the tile filters by virtue of the reverse cleaning system.

In addition, considerable advantages accrue from the use of a self-aligning and self-sealing connection between the outlet from the plenum chamber and the duct connected to the extractor/blower unit. By virtue of this arrangement the extractor duct is automatically connected to the plenum chamber when the storage chamber is in the horizontal position and thus ready to receive material to be stored.

The invention also provides an extraction apparatus which can be used for moisture-laden or dust-laden materials.

We claim:

1. Extraction apparatus mounted on a roadway wheeled vehicle and comprising:
   a. a storage chamber at the lower part of a detachably mounted tank;
   b. a plenum chamber at the upper part of said tank;
   c. means, including filter means, inter-connecting said storage chamber and said plenum chamber;
   d. outlet means at one end of said plenum chamber and in communication therewith;
   e. an extractor blower unit mounted in fixed position on said wheeled vehicle;
   f. detachable means connecting said extractor unit to said plenum-chamber outlet means, said connecting means being adapted to be disconnected to allow said outlet means, said plenum chamber and said storage chamber to be moved relative to said fixed extractor unit;
   g. a vent to atmosphere at said one end of said plenum chamber;
   h. inlet means at the opposite end of said storage chamber;
   i. valve means in said storage-chamber inlet means, in said plenum-chamber outlet means and in said plenum-chamber vent, whereby when said valves are placed in certain positions said extractor unit is effective to draw air through said inlet means into said storage chamber and through said filter means into said plenum chamber, and in other positions of said valves, air is sucked through said vent into said plenum chamber and through said filter means in the reverse direction into said storage chamber, thereby to effect self-cleaning of said filter means.

2. Apparatus according to claim 1 in which a partition is provided to define a filter chamber between the filter and the storage chamber.

3. Apparatus according to claim 1 wherein:
   a. a blower chamber is provided at the inlet end of said storage chamber, said blower chamber having an outlet;
   b. said extractor unit includes a blower;
   c. conduit means connect said blower to said blowing chamber, whereby material in said storage chamber is removable by blowing.

4. Apparatus according to claim 1 in which the filter is a ceramic filter.

5. Apparatus according to claim 4 in which the filter comprises ceramic filter tiles.

6. Apparatus according to claim 5 in which the tiles are removably mounted in a framework.

7. Extraction apparatus mounted on a roadway wheeled chassis, said apparatus comprising:
   a. an enlongated storage chamber at the lower part of a detachably mounted tank;
   b. a plenum chamber above and substantially coextensive with said storage chamber;
   c. filter means between and substantially coextensive with said storage and plenum chambers;
   d. input means at the rearward end of said storage chamber;
   e. valve means in said input means;
   f. outlet means in the forward end of said plenum chamber;
   g. vent means to atmosphere in said plenum-chamber outlet means;
   h. valve means in said vent means;
   i. blower means mounted in fixed position on said chassis forward of said storage chamber;
   j. disconnectable joint means connecting said blower means and said plenum-chamber outlet means through valve means mounted in fixed position on said chassis;
   k. said joint means adapted to be uncoupled to allow said plenum-chamber outlet means to be moved relative to said blower means and blower valve means;
   l. a blower chamber at the rearward end of said storage chamber;
   m. conduit means connecting said blower means and said blower chamber;
   n. said blower means adapted to create a low-pressure condition on the plenum-chamber outlet side of said blower means and a high-pressure condition on the blower chamber side; and
   o. a discharge outlet in said blower chamber.

8. Apparatus according to claim 7 wherein:
   a. aeration pipe means are provided at the rearward end of said storage chamber;
   b. hose means are provided between said aeration pipe means and said conduit means which connect said blower means to said blower chamber.

* * * * *